US008989254B2

(12) United States Patent
Jing et al.

(10) Patent No.: US 8,989,254 B2
(45) Date of Patent: Mar. 24, 2015

(54) SINGLE SERDES TRANSMITTER DRIVER DESIGN FOR BOTH ETHERNET AND PERIPHERAL COMPONENT INTERCONNECT EXPRESS APPLICATIONS

(71) Applicant: LSI Corporation, San Jose, CA (US)

(72) Inventors: Tai Jing, Los Altos, CA (US); Lijun Li, Milpitas, CA (US); Shiva Prasad Kotagiri, Campbell, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 98 days.

(21) Appl. No.: 13/851,502

(22) Filed: Mar. 27, 2013

(65) Prior Publication Data

US 2014/0181845 A1   Jun. 26, 2014

Related U.S. Application Data

(60) Provisional application No. 61/787,875, filed on Mar. 15, 2013, provisional application No. 61/745,141, filed on Dec. 21, 2012.

(51) Int. Cl.
| | |
|---|---|
| *H03H 7/30* | (2006.01) |
| *H03H 7/40* | (2006.01) |
| *H03K 5/159* | (2006.01) |
| *G06F 13/10* | (2006.01) |
| *H04L 25/03* | (2006.01) |

(52) U.S. Cl.
CPC ........ *G06F 13/102* (2013.01); *H04L 25/03878* (2013.01)
USPC .......................................................... 375/233

(58) Field of Classification Search
USPC .......................................................... 375/233
See application file for complete search history.

(56) References Cited

U.S. PATENT DOCUMENTS

| | | | |
|---|---|---|---|
| 7,307,447 B2 | 12/2007 | Clements et al. | ............... 326/30 |
| 7,368,902 B2 | 5/2008 | Clements et al. | .......... 324/158.1 |
| 7,511,530 B1 | 3/2009 | Cox et al. | ........................ 326/30 |
| 7,570,071 B2 | 8/2009 | Clements et al. | ............. 324/765 |
| 7,698,802 B2 | 4/2010 | Clements et al. | ............... 29/593 |
| 2013/0335120 A1* | 12/2013 | Bergkvist et al. | ............. 327/109 |

OTHER PUBLICATIONS

Philpott, R.A., et al., "A 20Gb/s SerDes Transmitter with Adjustable Source Impedance and 4-tap Feed-Forward Equalization in 65nm Bulk CMOS", IEEE 2008 Custom Integrated Circuits Conference (CICC), 2008, pp. 623-626.

(Continued)

*Primary Examiner* — Tanmay Shah
(74) *Attorney, Agent, or Firm* — Christopher P. Maiorana, PC (57) ABSTRACT

An apparatus includes a first coding circuit, a second coding circuit, and a plurality of source series terminated driver slices. The first coding circuit may be configured to generate a plurality of digital filter control codes in response to a plurality of filter coefficients and a control signal. The control signal selects between a plurality of communication specifications. The second coding circuit may be configured to generate a plurality of driver slice control codes in response to the plurality of digital filter control codes. The plurality of source series terminated driver slices configured to generate an output signal according to a selected one of the plurality of communication specifications in response to the plurality of driver slice control codes, a main cursor signal, a pre-cursor signal, and a post cursor signal.

20 Claims, 6 Drawing Sheets

(56) References Cited

OTHER PUBLICATIONS

Chen, S., et al., "A Novel SST Transmitter with Mutually Decoupled Impedance Self-Calibration and Equalization", IEEE International Symposium on Circuits and Systems—ISCAS, 2011, pp. 173-176.

Kossel, Marcel, et al., "A T-Coil Enhanced 8.5 Gb/s High-Swing SST Transmitter in 65 nm Bulk CMOS With <—16 dB Return Loss Over 10 GHz Bandwidth", IEEE Journal of Solid-State Circuits, vol. 42, No. 12, Dec. 2008, pp. 2905-2920.

Menolfi, Christian, et al., "A 16Gb/s Source-Series Terminated Transmitter in 65nm CMOS S01", 2007 IEEE International Solid-State Circuits Conference, 3 pages.

Quan, Shaolei, et al., "A 1.0625—to—14.025Gb/s multimedia transceiver with full-rate source-series-terminated transmit driver and floating-tap decision-feedback equalizer in 40nm CMOS", Solid-State Circuits Conference Digest of Technical Papers (ISSCC), 2011 IEEE International, 1 page.

* cited by examiner

DE-EMPHASIS = 20LOG$_{10}$ VB/VA
PRESHOOT = 20LOG$_{10}$ VC/VB
BOOST = 20LOG$_{10}$ VD/VB

SINGLE SERDES TRANSMITTER DRIVER DESIGN FOR BOTH ETHERNET AND PERIPHERAL COMPONENT INTERCONNECT EXPRESS APPLICATIONS

This application claims the benefit of U.S. Provisional Application No. 61/787,875, filed Mar. 15, 2013 and U.S. Provisional Application No. 61/745,141, filed Dec. 21, 2012 and are both hereby incorporated by reference in their entirety.

FIELD OF THE INVENTION

The invention relates to serial communication generally and, more particularly, to a method and/or apparatus for implementing a single serializer/deserializer (serdes) transmitter driver design for both Ethernet and peripheral component interconnect express (PCIe) applications.

BACKGROUND OF THE INVENTION

A data center or computer center is a facility used to house computer systems and associated components, such as telecommunications and storage systems. The computer systems and associated components are connected using various communication specifications. In general, the interconnection of the computer systems and associated components in data centers include both peripheral component interconnect express (PCIe) and Ethernet applications. Conventional systems use separate interfaces for each application. The use of separate interfaces means larger devices and higher cost.

It would be desirable to implement a single serdes transmitter driver design for both Ethernet and PCIe applications.

SUMMARY OF THE INVENTION

Embodiments of the invention include an apparatus including a first coding circuit, a second coding circuit, and a plurality of source series terminated driver slices. The first coding circuit may be configured to generate a plurality of digital filter control codes in response to a plurality of filter coefficients and a control signal. The control signal selects between a plurality of communication specifications. The second coding circuit may be configured to generate a plurality of driver slice control codes in response to the plurality of digital filter control codes. The plurality of source series terminated driver slices configured to generate an output signal according to a selected one of the plurality of communication specifications in response to the plurality of driver slice control codes, a main cursor signal, a pre-cursor signal, and a post cursor signal.

BRIEF DESCRIPTION OF THE DRAWINGS

Embodiments of the invention will be apparent from the following detailed description and the appended claims and drawings in which:

DETAILED DESCRIPTION OF THE PREFERRED EMBODIMENTS

In application specific integrated circuits (ASICs) used in data centers, it is increasingly desirable to have a single serial interface that can communicate in both peripheral component interconnect express (PCIe) and Ethernet applications. Embodiments of the invention provide a single serial interface that supports both applications, providing increased flexibility and reduction in silicon size and total cost. Embodiments of the invention include providing a method and/or apparatus for implementing a single serializer-deserializer (serdes) transmitter driver design that may (i) communicate in both Ethernet and peripheral component interconnect express (PCIe) applications, (ii) provide reduction in silicon size, (iii) provide reduction in total cost, (iv) utilize low power source-series terminated (SST) driver slices, (v) utilize digital control, and/or (vi) be implemented in an integrated circuit. In various embodiments, a plurality of low-power source-series terminated (SST) driver slices and digital control are used to satisfy both Ethernet and PCIe pre-cursor and post-cursor specifications. In some embodiments, the low power SST driver slices and digital control are used to also satisfy PCIe full swing and reduced swing power saving specifications.

Figure 1:
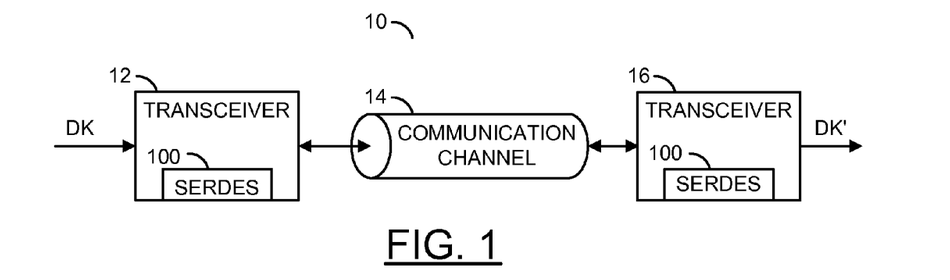
FIG. 1 is a diagram illustrating a communication system including a serializer/deserializer (serdes) device in which embodiments of the present invention may be implemented.

Referring to FIG. 1, a block diagram of a system 10 is shown illustrating a communication system in which coefficient programming schemes in accordance with embodiments of the invention may be implemented. The system 10 may be implemented as multiple circuits or devices, or on an integrated circuit. The system 10 may include a block (or circuit) 12, a block (or circuit) 14 and a block (or circuit) 16. The blocks 12 and 16 may implement transceiver circuits that include a serializer-deserializer (serdes) 100 in accordance with an embodiment of the invention. The block 12 is generally operational to generate signals carrying data to be communicated to the block 16. The block 12 may also be operational to receive signals carrying data received from the block 16. The signals may be communicated between the block 12 and the block 16 via the block 14. The block 14 may be fabricated as one or more of traces, wires, transmission lines, optical fiber, and wireless media. The block 12 may be fabricated as one or more integrated circuits. The block 16 may be fabricated as one or more integrated circuits.

In the system 10, communications are facilitated by the serializer-deserializer (serdes) apparatus 100. In the serdes apparatus (or device) 100, parallel data is serialized in a transmitter (e.g., the block 12), transferred as serial data on a communication channel (e.g., the block 14) and subsequently deserialized back into the parallel data in a receiver (e.g., the block 16). An equivalent, but opposite path may be implemented to transmit data in the reverse direction. The blocks 12-16 may represent modules and/or blocks that may be implemented as hardware, software, a combination of hardware and software, or other implementations. In general, the serdes device 100 contains a transmitter and a receiver. A signal (e.g., DK) may be received by the block 12. The signal DK may implement a parallel data signal. The block 12 transmits the data from the signal DK to the block 16 via the block 14. A signal (e.g., DK') may be generated by the block 16. The signal DK' carries recovered data. Ideally, the data carried by the signal DK' is equivalent to the data in the signal DK.

The circuit 12 may participate in a transmitter adaptation capability to account for channel pulse (or impulse) response characteristics of the circuit 14. A filter within the circuit 12 may be initially adapted to the circuit 14 based on an estimation of the channel pulse response. The adaptation generally involves adjusting one or more tap weights of the filter. After the initial adaptation, the adaptation may be performed continuously to account for changing conditions in the circuit 14. In some embodiments, the filter may be implemented as a finite impulse response (e.g., FIR) filter. However, other filters may be implemented accordingly to meet the design criteria of a particular application.

The block 14 may implement a communication channel. The block 14 is generally operational to carry the data communicated from the block 12 to the block 16. The block 14 may also carry data communicated from the block 16 to the block 12. The channel pulse response characteristics of the block 14 generally cause distortions in amplitude and/or phase of the data signals as the data signals propagate from one port of the block 14 to the other. The channel pulse response characteristics may also change over time and/or temperature. Implementations of the block 14 may include, but are not limited to, one or more transmission media such as air, wire, transmission line, optical fibre, Ethernet, PCIe lane and the like.

The block 16 may implement a receiver circuit. The block 16 is generally operational to receive signals from the block 12 via the block 14. The block 16 may also be operational to send signals to the block 12 via the block 14. The block 16 may include a receiver adaptation capability to account for the pulse response characteristics of the blocks 12 and 14. One or more equalizers within the block 16 may be initially adapted to the block 14 based on a sequence of pulses (or impulses) received from the block 12. The adaptation generally involves adjusting one or more tap weights and/or programmable gain values of the equalizers. Once the tap weights have converged, the tap weights may be used as an estimate of the channel pulse response characteristics of the block 14. The receiver adaptation may be performed continuously to account for changing conditions in the block 14. In some embodiments, the equalizers may be implemented as a liner equalizer (e.g., LE), a decision feedback equalizer (e.g., DFE), and/or a continuous time decision feedback equalizer (e.g., CT-DFE). However, other types and numbers of equalizers may be implemented accordingly to meet the design criteria of a particular application.

Figure 2:
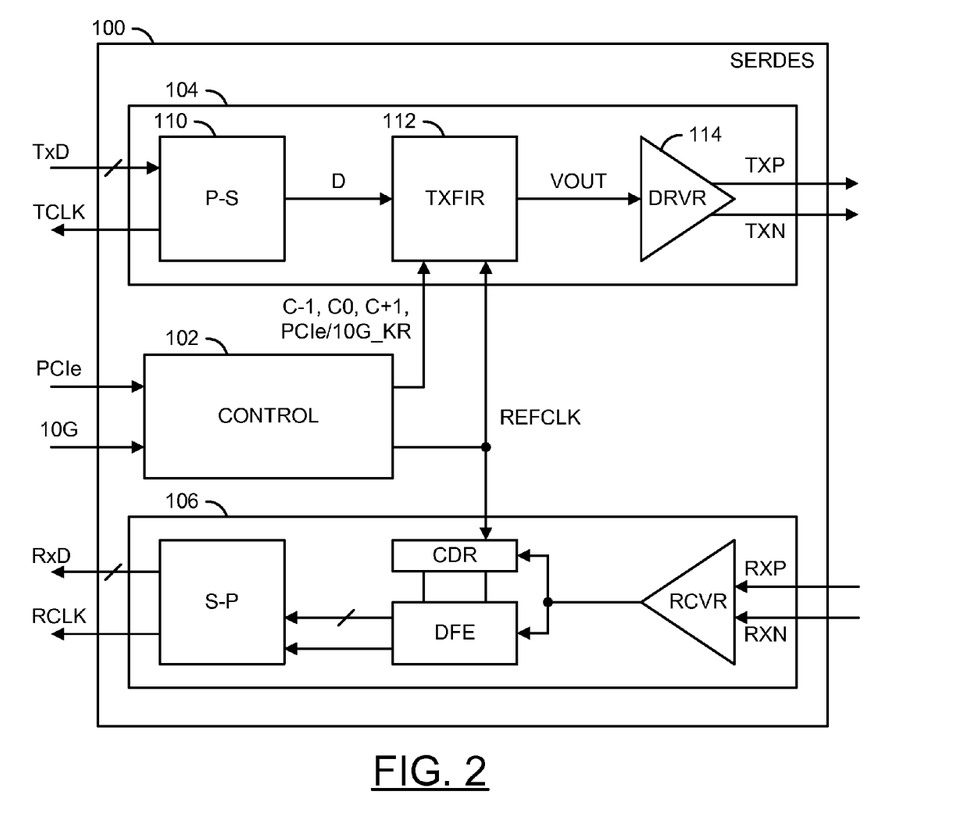
FIG. 2 is a diagram illustrating a serdes device in accordance with embodiments of the present invention.

Referring to FIG. 2, a diagram is shown illustrating an example implementation of the device 100 in accordance with an embodiment of the invention. The device 100 generally implements a serializer-deserializer (serdes). In some embodiments, the device 100 may comprise a block (or circuit) 102, a block (or circuit) 104, and a block (or circuit) 106. The block 102 may implement a control module or circuit. The block 104 may implement a transmitter module or circuit. The block 106 may implement a receiver module or circuit. The blocks 102-106 may represent modules and/or blocks that may be implemented as hardware, software, a combination of hardware and software, or other implementations.

In some embodiments, parallel data (e.g., TxD) may be serialized in the transmitter module (e.g., the block 104) and presented, in one example, as complementary serial data signals (e.g., TXP, TXN). The complementary serial data signals TXP, TXN are configured for transmission on a communication channel (e.g., the block 14 of FIG. 1) and subsequent deserialization in a receiver. In some embodiments, the device 100 can also receive data (e.g., complementary serial data signals RXP and RXN) from a transmitter via the same or a different communication channel and deserialize the received data (e.g., in the block 106) back into parallel data (e.g., RxD).

The block 102 is generally configured to generate various control signals for configuring and controlling the blocks 104 and 106. In some embodiments, for example, the block 102 is configured to generate coefficients (e.g., C−1, C0, C+1) and a control signal (e.g., PCIe/10G_KR) that may be utilized to control a transmitter finite impulse response filter (TXFIR) of the block 104. In some embodiments, the block 102 is configured to generate the particular values of the coefficients C−1, C0, C+1 based upon whether the device 100 is being used according to a first communication specification (e.g., in an Ethernet application) or a second communication specification (e.g., a PCIe application).

When the Ethernet compliant mode is selected, the coefficients Cn1, C0, Cp1 are received from the Ethernet PCS layer. The amplitude of the output signal VOUT is changed through the coefficients Cn1, C0, Cp1. In various embodiments, C0 code[5:0]={C0 pin[4:0], 1'b0}, C−1 code[4:0]={Cn1 pin[3:0], 1'b0}, and C+1 code[5:0]={Cp1 pin[4:0], 1'b0}. When the PCIe compliant mode is selected, the coefficients Cn1 and Cp1 are received from the PCIe PIPE layer. Amplitude (e.g., full swing=900 mV peak to peak, reduced swing=720 mV peak to peak) is also received from the PCIe PIPE layer. In various embodiments, C−1 code[4:0]={Cn1 pin[3:0]}, C+1 code[5:0]={Cp1 pin[4:0]}, and the coefficient C0 is derived from coefficients C−1 and C+1 (e.g., C0 code[5:0]=30−amplitude/15+(C−1 code)+(c+1 code), where amplitude represents the peak magnitude value (e.g., 450 for full swing and 360 for reduced swing). Hence, the amplitude of the output signal VOUT in the PCIe compliant mode is set at either full swing (e.g., 900 mV peak to peak) or reduced swing (e.g., 720 mV peak to peak).

In various embodiments, one or more control signals may be implemented to select between the first and second communication specifications. In some embodiments, a first input signal (e.g., 10G) may be configured to select or enable operation according to the first communication specification and a second input signal (e.g., PCIe) may be configured to select or enable operation according to the second communication specification. In some embodiments, a single input signal (e.g., 10G/PCIe) having two states may be implemented to switch between the two communication specification (or modes).

In various embodiments, the block 104 comprises a block (or circuit) 110, a block (or circuit) 112, and a block (or circuit) 114. The block 110 may implement a parallel to serial converter. The block 112 may implement a transmitter finite impulse response filter (TXFIR). In various embodiments, the block 112 is implemented with a source series terminated (SST) driver having a number (e.g., n) of slices (or segments), each with a predetermined resolution (e.g., VDD/n). In some embodiments, the number of slices is sixty (e.g., n=60) with each slice having a resolution of 15 mV. The block 114 may implement an optional transmitter output driver (DRVR).

In some embodiments, the block 110 has an input that receives the parallel data TxD, an output that presents a transmit clock (e.g., TCLK), and an interface for communicating serial data (e.g., D) to the block 112. In some embodiments, the block 112 has a first input that receives the serial data D, a second input that receives the coefficients C−1, C0, C+1, and the control signal PCIe/10G_KR, a third input that receives a system reference clock (e.g., REFCLK), and an output that presents a signal (e.g., VOUT). In some embodiments, the output of the block 112 may present complementary signals (e.g., +VOUT and −VOUT). The output of the block 112 may be part of an interface operatively coupling the block 112 to the block 114. In some embodiments, the block 114 has a pair of complementary outputs that present complementary serial data signals TXP and TXN. In other embodiments, the block 114 has a single output that presents a single-ended serial data signal. In still other embodiments, a user can select between single-ended and complementary outputs.

In some embodiments, the block 112 (and optionally the block 114) is configured to generate either Ethernet (e.g., 10G KR, etc.) compliant or PCIe compliant signals depending upon the values of the coefficients C−1, C0, C+1, and the control signal PCIe/10G_KR. In various embodiments, the block 104 may switch between a first mode that provides Ethernet compliant signals and a second mode that provides PCIe compliant signals in response to the coefficients C−1, C0, C+1 and/or the control signal PCIe/10G_KR.

Figure 3:
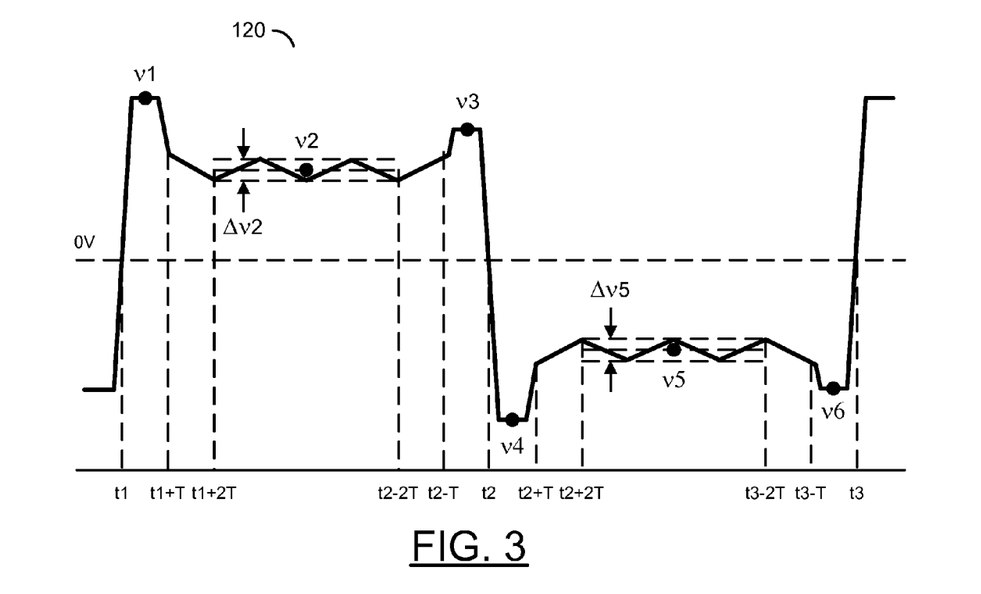
FIG. 3 is a diagram illustrating an example Ethernet transmitter output waveform.

Referring to FIG. 3, a diagram is shown illustrating an example Ethernet transmitter output waveform 120 that may be generated by the block 104 of FIG. 2. The output waveform 120 is generally compliant with the output waveform requirements in FIG. 72-12 and Table 72-7 of the IEEE 802.3 specification, which are incorporated herein by reference.

Figure 4:
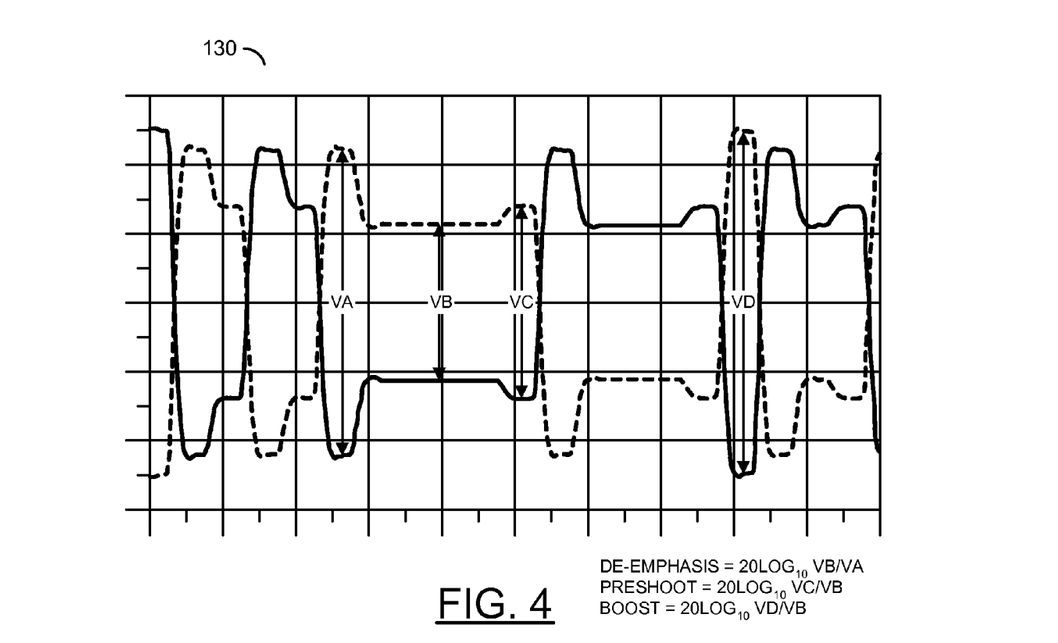
FIG. 4 is a diagram illustrating an example PCIe transmitter output waveform.

Referring to FIG. 4, a diagram is shown illustrating an example PCIe transmitter output waveform 130 that may be generated by the block 104 of FIG. 2. The output waveform 130 is generally compliant with the output waveform requirements in FIG. 4-42 and Table 4-16 of the PCIe specification, which are herein incorporated by reference.

Figure 5:
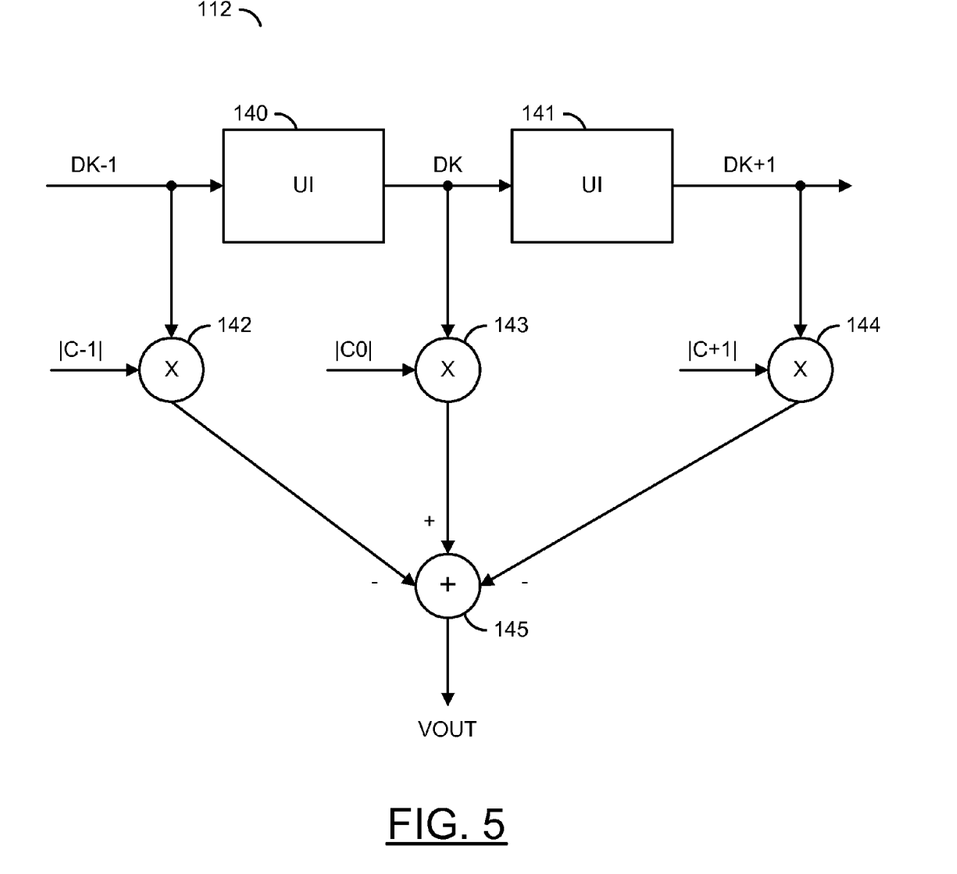
FIG. 5 is a diagram illustrating an example TXFIR block of FIG. 2.

Referring to FIG. 5, a diagram is shown illustrating an example implementation of the TXFIR block 112 of FIG. 2. The block 112 is shown implemented as a three-tap feed forward equalizer (FFE). In an FFE, a serial data signal (e.g., D) is delayed by a number of delay elements (UI) which implement the taps of the filter. In various embodiments, the block 112 is implemented having three taps: a main tap (DK), a pre-cursor tap (DK−1); a post-cursor tap (DK+1). The terms main, pre-cursor and post-cursor refer to whether the signal being operated on is a current signal, an advanced signal, or a delayed signal, respectively, relative to a time 0. The main tap operates on a current data sample (e.g., DK). The pre-cursor tap operates on a data sample (e.g., DK−1), which is advanced relative to a current data sample DK. The post-cursor tap operates on a data sample (e.g., DK+1) which is delayed relative to the current data sample DR. Each tap (e.g., DK+1, DK, DK−1) is multiplied by a tap weight value (also called a filter coefficient), and the results are summed and driven to an output of the filter. The number of taps on the filter, the spacing of the taps relative to the baud rate, and the granularity of the tap weight values vary based upon the particular implementation. The tap weight values are generally selected based upon the particular communication specification selected to generate a filter with the inverse transfer function of the channel transfer function.

In some embodiments, the block 112 comprises a block (or circuit) 140, a block (or circuit) 141, a block (or circuit) 142, a block (or circuit) 143, a block (or circuit) 144, and a block (or circuit) 145. The blocks 140 and 141 may be implemented as unit interval (UI) delay elements. In some embodiments the delay elements are flip-flops. The blocks 142, 143, and 144 may be implemented as multipliers. The block 145 may be implemented as an adder.

A serial data stream is presented to an input of the block 140. An output of the block 140 presents the serial data stream delayed by one unit interval. The output of the block 140 is presented to an input of the block 141. An output of the block 141 presents the serial data stream delayed by another unit interval. The input to the block 140 is also presented to a first input of the block 142. The output of the block 140 is presented to a first input of the block 143. The output of the block 141 is presented to a first input of the block 144. The TXFIR coefficients C−1, C0, and C+1 are presented to a second input of each of the blocks 142, 143, and 144, respectively. An output of the block 142 is presented to a first input of the block 145. An output of the block 144 is presented to a second input of the block 145. An output of the block 144 is presented to a third input of the block 145. An output of the block 145 presents the signal VOUT. In various embodiments, the first and third inputs of the block 145 may be implemented as subtracting inputs, and the second input may be implemented as a summing input. As would be apparent to person of ordinary skill in the art, other configurations may be implemented to produce an equivalent result. The signal VOUT generally represents a weighted version of a current data symbol (e.g., DK) with pre-cursor and post-cursor contributions subtracted (e.g., VOUT=(C0*DK)−(C−1*DK−1)−(C+1*DK+1)).

Figure 6:
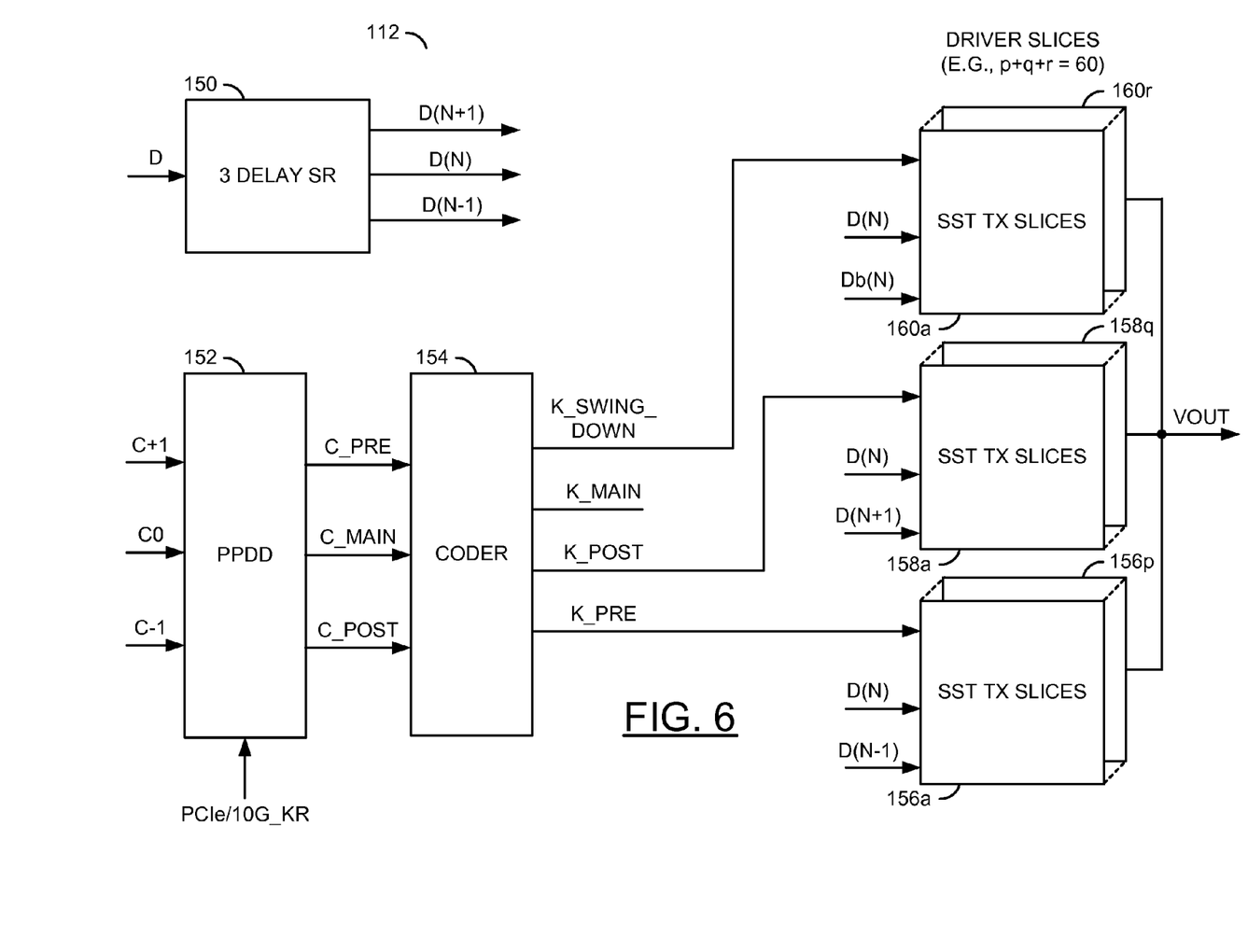
FIG. 6 is a diagram illustrating an example implementation of the TXFIR block of FIG. 5 in accordance with an embodiment of the invention.

Referring to FIG. 6, a diagram is shown illustrating an implementation of the block 112 of FIG. 2 in accordance with an embodiment of the invention. In various embodiments, the block 112 comprises a block (or circuit) 150, a block (or circuit) 152, a block (or circuit) 154, a number of blocks (or circuits) 156a-156p, a number of blocks (or circuits) 158a-158q, and a number of blocks (or circuits) 160a-160r. The blocks 150-160r may represent modules and/or circuits that may be implemented as hardware, software, a combination of hardware and software, or other implementations. The blocks 150-160r may be configured to provide the TXFIR operation described in connection with FIG. 5.

In various embodiments, the block 150 is configured to generated a main cursor signal (e.g., D(N)), a pre-cursor signal (e.g., D(N−1)), and a post-cursor signal (e.g., D(N+1)) in response to the data signal D. In some embodiments, the block 150 is implemented as a 3 delay shift register. The block 152 is implemented as a pre-emphasis protocol dependent decoder (PPDD). The terms pre-emphasis and de-emphasis refer to filter architecture, and indicate whether a signal amplitude is increased or decreased as compared to the non-emphasized value by a filter tap. The block 152 is configured to generate a number of C-values (e.g., C_PRE, C_MAIN, C_POST) in response to digital protocol control signals (e.g., the signals C−1, C0, and C+1) and a protocol selection signal (e.g., the signal PCIe/10G_KR). The block 154 implements a send stage encoder/decoder. The block 154 is configured to generated a number of K-values (e.g., K_PRE, K_POST, K_MAIN, and SWING_DOWN) in response to the C-values generated by the block 152. Each of the blocks 156a-156p, 158a-158q, and a 160a-160r implements a source series terminated (SST) transmitter slice. The blocks 156a-156p generally implement a pre-cursor portion of slices (or unit). The blocks 158a-158q generally implement a post-cursor portion of slices (or unit). The blocks 160a-160r generally implement a swing_down portion of slices (or unit).

In various embodiments, the block 152 has a first input that receives the signal C+1, a second input that receives the signal C0, a third input that receives the signal C−1, a fourth input that receives the signal PCIe/10G_KR, a first output that presents the signal C_PRE, a second output that presents the signal C_MAIN, and a third output that presents the signal C_POST. The block 154 has a first input that receives the signal C_PRE, a second input that receives the signal C_MAIN, a third input that receives the signal C_POST, a first output that presents the signal K_PRE, a second output that presents the signal K_MAIN, a third output that presents the signal K_POST, and a fourth output that presents the signal K_SWING_DOWN.

Each of the blocks 156a-156p has a first input that receives the signal K_PRE, a second input that receives the signal D(N), a third input that receives the signal D(N−1), and an output that contributes to the signal VOUT. Each of the blocks 158a-158q has a first input that receives the signal K_POST, a second input that receives the signal D(N), a third input that receives the signal D(N+1), and an output that contributes to the signal VOUT. Each of the blocks 160a-160r has a first input that receives the signal K_SWING_DOWN, a second input that receives the signal D(N), a third input that receives a complement of the signal D(N) (e.g., Db(N)), and an output that contributes to the signal VOUT. The total number of slices implemented may be represented by the number N. In some embodiments, the total number of slices is 60 (e.g., N=60). In various embodiments, a value of the signal K_SWING_DOWN is determined by the total number of slices less the number of slices assigned to the pre-cursor, post-cursor, and main cursor taps (e.g., K_SWING_DOWN=N−K_MAIN−K_PRE−K_POST).

In various embodiments, map rules in accordance with an embodiment of the invention may be applied as illustrated by the following example, where VDD=900 mV, the number of slices N=60, and the voltage adjustment step VDD/N=15 mV. The system level FIR coefficients (e.g., C−1, C0, C+1) are used to determine the digital level FIR control codes (e.g., C_PRE, C_MAIN, C_POST):

$$C\_POST = |C+1| * y\_pp/(VDD/n),$$

$$C\_MAIN = 0.5 * N - (|C0| * y\_pp/(VDD/n)),$$
$$= 0.5 * N - y\_pp/(VDD/n) + C\_POST + C\_PRE,$$

$$C\_PRE = |C-1| * y\_pp/(VDD/n),$$

where y_pp represents the current setting amplitude voltage value. In general, C_POST is rounded to nearest xxxx.x, C_PRE is rounded to nearest xxxx.x, and C_MAIN is rounded to nearest xxxx.x with 0.5*N−y_pp/(VDD/n) rounded to nearest xxxx.0. The constraint that the total xxxx.1 format number for C_MAIN, C_POST, and C_PRE be an even number (e.g., 0 or 2) can be automatically met. Therefore, the difference "C_MAIN−C_POST−C_PRE" is generally an integer number. The digital level FIR control codes C_PRE, C_MAIN, and C_POST are used to determine analog driver slice number level FIR control codes (e.g., K_PRE, K_MAIN, K_POST). For example, $$C\_PRE = K\_PRE/2,$$

$$C\_POST = K\_POST/2,$$

$$C\_MAIN = N - k + C\_PRE + C\_POST$$
$$= n - K\_MAIN - C\_PRE - C\_POST.$$

In some embodiments, the TX output driver limits the maximum peak to peak voltage to a range from about 380 mV to about 950 mV. In some embodiments, 950 mV peak to peak (or 475 mV single ended) may be the default voltage. In some embodiments, an input signal (e.g., TXAMPCTRL) may be implemented allowing the user to lower the output voltage. In one example, the signal TXAMPCTRL may be implemented as a four bit signal (e.g., TXAMPCTRL[3:0]). In some embodiments, there may be analog constraints on the TXFIR coefficients. In one example, the analog constraints may be summarized as follows:

(C−1+C+1) voltage<=C0 voltage;

C−1 amplitude<=112.5 mV;

C+1 amplitude<=187.5 mV;

C0 amplitude>=150 mV.

In the PCIe compliant mode, the TXFIR coefficient values C−1, C0, and C+1 should add up to unity (e.g., |C−1|+|C0|+|C−1|=1). Hence, |C0| is not independent. |C0| is derived as |C0|=1−|C−1|−|C+1|. All terms are expressed in fractions and are less than or equal to one. In some embodiments, the value of the coefficient C−1 is less than or equal to one-quarter (e.g., |C−1|<=0.25). The difference of the value of the coefficient C0 and the values of the coefficients C−1 and C+1 is greater than or equal to the low frequency (LF) value of the TXFIR (e.g., |C0|−|C−1|−|C+1|>=LF).

In some embodiments, the PCIe TX amplitude control (e.g., TXAMPCTRL[3:0]) may be used to alter the TX driver output voltage. For example, when TXAMPCTRL is changed, the amplitude of the signal VOUT changes. In one example, the amplitude of the signal VOUT may be set as follows:

If TXAMPCTRL is 0x3, |C−1|+|C0|+|C−1|=475 mV;

If TXAMPCTRL is 0x2, |C−1|+|C0|+|C−1|=380 mV;

If TXAMPCTRL is 0x1, |C−1|+|C0|+|C−1|=285 mV;

If TXAMPCTRL is 0x0, |C−1|+|C0|+|C−1|=190 mV.

Thus, when the values |C−1|, |C+1|, and TXAMPCTRL[3:0] are known, the values of TXFIR settings can be looked up from a look-up table containing an analog-to-digital (A/D) interface specification.

In some embodiments, a PCIe calculation for full swing operation may be performed as illustrated by the following example. The coefficients C+1 and C−1 along with amplitude control info should be driven by the pins. There are four cases, peak amplitude 475, 380, 285, and 190 mV, determined by the value of the amplitude control info TXAMPCTRL (e.g., 0 (190 mv) to 3 (475 mv)). The value of C0 is determined using the following equation:

$$C0 \text{ fraction}=1-(C+1 \text{ fraction}+C-1 \text{ fraction}).$$

For example, setting C+1=7 (over 60 slices, or segments), C−1=9 (over 60 slices) and TXAMPCTRL=3 (450 mV), the value 7 is represented as 000111 through pins, the value 9 is represented as 001001, and C0 is calculated as 1−7/60−9/60=44/60. The intended voltage levels are C0=44/60*475=348 mV, C−1=9/60*475=71.25 mV, C+1=7/60*475=55.4 mV.

The C+1 and C−1 codes may be found in look-up tables, as illustrated by TABLES 2 and 3 below, respectively: C−1 code=001001 and C+1 code=000111. The LSB of the C−1 and C+1 codes represent one-half (0.5) unit. The C0 look up table is not used. Instead, the C0 code is determined from the C−1 and C+1 codes: 00100.1+00011.1=4.5+3.5=8, or (01000.0).

A PCIe calculation in reduced swing may be performed using the following TABLE 1:

TABLE 1

| AMPLITUDE | C−1 CODE | C0 CODE | C+1 CODE | SLICES (FS) |
|---|---|---|---|---|
| 450 | 0-16 | 40-60 | 0-25 | 60 |
| 360 | 0-16 | 28-48 | 0-25 | 48 |
| 270 | 0-16 | 16-36 | 0-25 | 36 |
| 180 | 0-16 | 4-24 | 0-25 | 24 |

For example, for amplitude=270 mV, C+1:7 is represented as 000111 through pins, C−1:9 is represented as 001001, so C0 is 1−7/36−9/36=20/36. The intended voltages are C0=20/36*270=150 mV, C−1=9/36*270=67.5 mV, and C+1=7/36*270=52.5 mV. The C−1 and C+1 codes are found from TABLES 2 and 3 (e.g., C−1 code: 001001, C+1 code: 000111), and the C0 code derived using the above equations (e.g., C0 code=30−270/15 4.5+3.5=20. (10100.0)).

A simplified PCIe calculation is illustrated by the following example. By inspection, the C−1 and C+1 codes after look up are the same as the pin inputs. C0 code=30−amplitude/15+(C−1 code)+(C+1 code), where the LSB of the codes has a weight of one-half unit, and the amplitude is selected from 450, 360, 270, and 180 my. LF is 20 across all swings. To satisfy the PCIe specification, full swing (FS) should use 60 slices, and reduced swing (RS) should use 48 slices.

An example of a process for performing non-PCIe calculations may be summarized as follows. In general, the values of C+1, C0 and C−1 are driven by the pins. Amplitude control pins are ignored. Instead, amplitude is changed through the values of C+1, C0, and C−1. The C0, C−1, and C+1 codes are determined as follows: C0 code[5:0]={C0 pin[4:0], 1'b0}, C−1 code[4:0]={cn1 pin[3:0], 1'b0}, C+1 code[5:0]={cp1 pin[4:0], 1'b0}. For example, C+1=7 (over 60 segments), C−1=8 (over 60 segments), C0=18 (max amplitude can be 16; here 18 is used as example). C+1 is represented as 00111 through pins. C−1 is represented as 1000. C0 is represented as 10010 through pins. The output codes are C0={10010,0}, C−1={01000,0}, C+1={00111,0}. The results can be checked using TABLES 2-4 below. C0 is 180 mV, C+1 is 105 mV, and C−1 is 120 mV. As can be seen, the result for the non-PCIe calculation is different from the PCIe case.

An example look-up table of binary (e.g., register and pins) values and corresponding tap values for the C−1 coefficient may be summarized as in the following TABLE 2:

TABLE 2

| C_PRE (REGISTER) | C_PRE (PCIe PIN) | C_PRE (ETHERNET PIN) | C−1 TAP VALUE (mV) |
|---|---|---|---|
| 0000.0 | 0000.0 | 0000 | 0 |
| 0000.1 | 0000.1 | N/A 0000 | 7.5 |
| 0001.0 | 0001.0 | 0001 | 15 |
| 0001.1 | 0001.1 | N/A 0001 | 22.5 |
| 0010.0 | 0010.0 | 0010 | 30 |
| 0010.1 | 0010.1 | N/A 0010 | 37.5 |
| 0011.0 | 0011.0 | 0011 | 45 |
| 0011.1 | 0011.1 | N/A 0011 | 52.5 |
| 0100.0 | 0100.0 | 0100 | 60 |
| 0100.1 | 0100.1 | N/A 0100 | 67.5 |
| 0101.0 | 0101.0 | 0101 | 75 |
| 0101.1 | 0101.1 | N/A 0101 | 82.5 |
| 0110.0 | 0110.0 | 0110 | 90 |
| 0110.1 | 0110.1 | N/A 0110 | 97.5 |
| 0111.0 | 0111.0 | 0111 | 105 |
| 0111.1 | 0111.1 | N/A 0111 | 112.5 |
| N/A 1000.0 | N/A 1000.0 | 1000 | 120 |

An example look-up table of binary (e.g., register and pins) values and corresponding tap values for the C+1 coefficient may be summarized as in the following TABLE 3:

TABLE 3

| C_POST (REGISTER) | C_POST (PCIe PIN) | C_POST (ETHERNET PIN) | C+1 TAP VALUE (mV) |
|---|---|---|---|
| 00000.0 | 00000.0 | 00000 | 0 |
| 00000.1 | 00000.1 | N/A 00000 | 7.5 |
| 00001.0 | 00001.0 | 00001 | 15 |
| 00001.1 | 00001.1 | N/A 00001 | 22.5 |
| 00010.0 | 00010.0 | 00010 | 30 |
| 00010.1 | 00010.1 | N/A 00010 | 37.5 |
| 00011.0 | 00011.0 | 00011 | 45 |
| 00011.1 | 00011.1 | N/A 00011 | 52.5 |
| 00100.0 | 00100.0 | 00100 | 60 |
| 00100.1 | 00100.1 | N/A 00100 | 67.5 |
| 00101.0 | 00101.0 | 00101 | 75 |
| 00101.1 | 00101.1 | N/A 00101 | 82.5 |
| 00110.0 | 00110.0 | 00110 | 90 |
| 00110.1 | 00110.1 | N/A 00110 | 97.5 |
| 00111.0 | 00111.0 | 00111 | 105 |
| 00111.1 | 00111.1 | N/A 00111 | 12.5 |
| 01000.0 | 01000.0 | 01000 | 120 |
| 01000.1 | 01000.1 | N/A 01000 | 127.5 |
| 01001.0 | 01001.0 | 01001 | 135 |
| 01001.1 | 01001.1 | N/A 01001 | 142.5 |
| 01010.0 | 01010.0 | 01010 | 150 |
| 01010.1 | 01010.1 | N/A 01010 | 157.5 |
| 01011.0 | 01011.0 | 01011 | 165 |
| 01011.1 | 01011.1 | N/A 01011 | 172.5 |
| 01100.0 | 01100.0 | 01100 | 180 |
| 01100.1 | 01100.1 | N/A 01100 | 187.5 |

An example look-up table of binary (e.g., register and pins) values and corresponding tap values for the C0 coefficient may be summarized as in the following TABLE 4:

TABLE 4

| C0 (REGISTER) | C0 (PCIe PIN) | C0 (ETHERNET PIN) | C0 TAP VALUE (mv) |
|---|---|---|---|
| 00000.0 | IGNORED | 00000 | 450 |
| 00000.1 | IGNORED | N/A 00000 | 442.5 |
| 00001.0 | IGNORED | 00001 | 435 |
| 00001.1 | IGNORED | N/A 00001 | 427.5 |
| 00010.0 | IGNORED | 00010 | 420 |
| 00010.1 | IGNORED | N/A 00010 | 412.5 |
| 00011.0 | IGNORED | 00011 | 405 |
| 00011.1 | IGNORED | N/A 00011 | 397.5 |
| 00100.0 | IGNORED | 00100 | 390 |
| 00100.1 | IGNORED | N/A 00100 | 382.5 |
| 00101.0 | IGNORED | 00101 | 375 |
| 00101.1 | IGNORED | N/A 00101 | 367.5 |
| 00110.0 | IGNORED | 00110 | 360 |
| 00110.1 | IGNORED | N/A 00110 | 352.5 |
| 00111.0 | IGNORED | 00111 | 345 |
| 00111.1 | IGNORED | N/A 00111 | 337.5 |
| 01000.0 | IGNORED | 01000 | 330 |
| 01000.1 | IGNORED | N/A 01000 | 322.5 |
| 01001.0 | IGNORED | 01001 | 315 |
| 01001.1 | IGNORED | N/A 01001 | 307.5 |
| 01010.0 | IGNORED | 01010 | 300 |
| 01010.1 | IGNORED | N/A 01010 | 292.5 |
| 01011.0 | IGNORED | 01011 | 285 |
| 01011.1 | IGNORED | N/A 01011 | 277.5 |
| 01100.0 | IGNORED | 01100 | 270 |
| 01100.1 | IGNORED | N/A 01100 | 262.5 |
| 01101.0 | IGNORED | 01101 | 255 |
| 01101.1 | IGNORED | N/A 01101 | 247.5 |
| 01110.0 | IGNORED | 01110 | 240 |
| 01110.1 | IGNORED | N/A 01110 | 232.5 |
| 01111.0 | IGNORED | 01111 | 225 |
| 01111.1 | IGNORED | N/A 01111 | 217.5 |
| 10000.0 | IGNORED | 10000 | 210 |
| 10000.1 | IGNORED | N/A 10000 | 202.5 |
| 10001.0 | IGNORED | 10001 | 195 |
| 10001.1 | IGNORED | N/A 10001 | 187.5 |
| 10010.0 | IGNORED | 10010 | 180 |
| 10010.1 | IGNORED | N/A 10010 | 172.5 |
| 10011.0 | IGNORED | 10011 | 165 |

TABLE 4-continued

| C0 (REGISTER) | C0 (PCIe PIN) | C0 (ETHERNET PIN) | C0 TAP VALUE (mv) |
|---|---|---|---|
| 10011.1 | IGNORED | N/A 10011 | 157.5 |
| 10100.0 | IGNORED | 10100 | 150 |

The PCIe LF values are generally determined by the PCIe system layer. For example, if the system layer needs the DC swing to be greater than 50 mV, the LF is set to 50 mV/7.5 mV=7. Thus, C0−|C−1|−|C+1|>=7 (After normalization, C0−|C−1|−|C+1|>=7/60). In some embodiments, the recommended LF value is 20 for both full swing and reduced swing.

Figure 7:
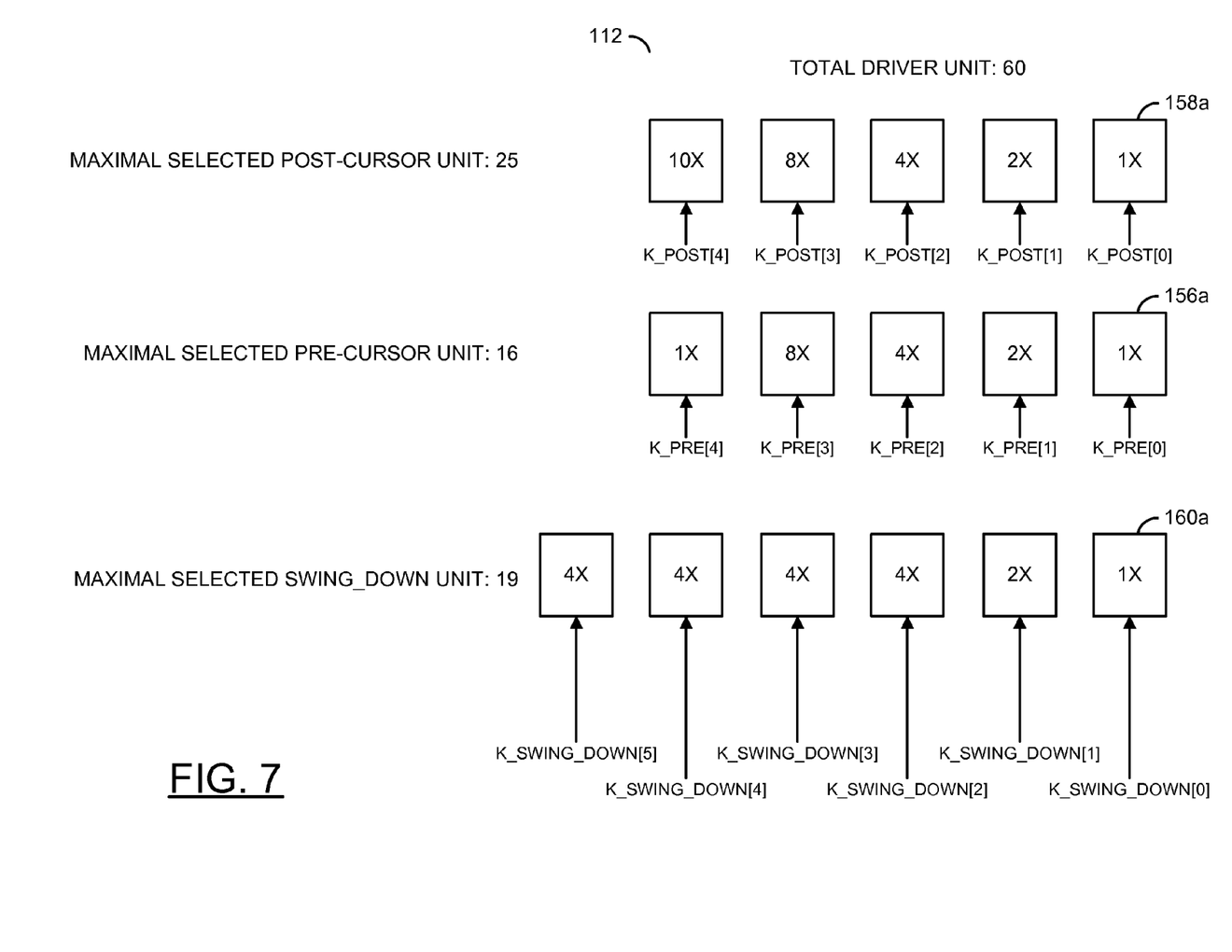
FIG. 7 is a diagram illustrating an example grouping of source-series terminated transmitter slices of FIG. 6 in accordance with an embodiment of the invention.

Referring to FIG. 7, a diagram is shown illustrating an example grouping of the source-series terminated (SST) transmitter slices 156a-154p, 158a-158q, and 160a-160r of FIG. 6. In some embodiments, the block 112 is implemented having a total of sixty source series terminated (SST) slices. The block 112 may be implemented such that each SST slice has a 15 mV resolution. In some embodiments, the sixty SST slices may be decoded to provide a post-cursor unit (e.g., slices 158a-158q) with 25 slices, a pre-cursor unit (e.g., slices 156a-156p) with 16 slices, and a swing_down unit (e.g., slices 160a-160r) with nineteen slices.

In various embodiments, the slices of the post-cursor unit may be divided, in one example, into five groups, each controlled, for example, by a respective bit of a control signal (e.g., K_POST[4:0]). In some embodiments, the slices of the post-cursor unit may be divided as follows: one slice controlled by the bit K_POST[0]; two slices controlled by the bit K_POST[1]; four slices controlled by the bit K_POST[2]; eight slices controlled by the bit K_POST[3]; and ten slices controlled by the bit K_POST[4].

In various embodiments, the slices of the pre-cursor unit may be divided also into five groups, each controlled, for example, by a respective bit of a control signal (e.g., K_PRE [4:0]). In some embodiments, the slices of the pre-cursor unit may be divided as follows: one slice controlled by the bit K_PRE[0]; two slices controlled by the bit K_PRE[1]; four slices controlled by the bit K_PRE[2]; eight slices controlled by the bit K_PRE[3]; and one slice controlled by the bit K_PRE[4].

In various embodiments, the slices of the swing_down unit may be divided into six groups, each controlled, for example, by a respective bit of a control signal (e.g., K_SWING_DOWN[5:0]). In some embodiments, the slices of the swing_down unit may be divided as follows: one slice controlled by the bit K_SWING_DOWN[0]; two slices controlled by the bit K_SWING_DOWN[1]; four slices controlled by the bit K_SWING_DOWN[2]; four slices controlled by the bit K_SWING_DOWN[3]; four slices controlled by the bit K_SWING_DOWN[4]; and four slices controlled by the bit K_SWING_DOWN[5].

Figure 8:
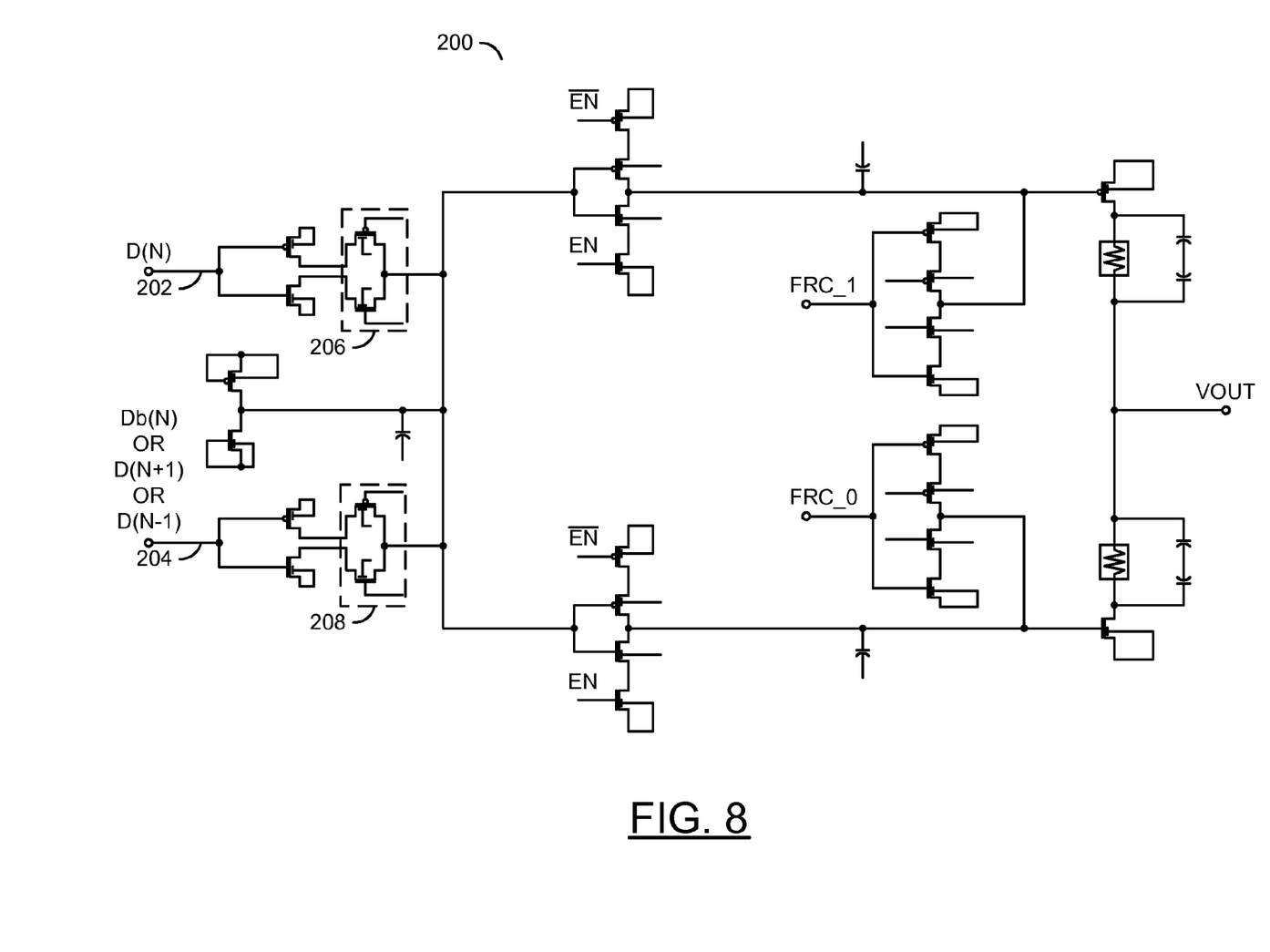
FIG. 8 is a diagram illustrating an example implementation of a source series terminated transmitter slice of FIG. 6.

Referring to FIG. 8, a schematic diagram of a circuit 200 is shown illustrating an example implementation of a SST slice in accordance with an embodiment of the invention. The circuit 200 may be used to implement each of the slices 156a-154p, 158a-158q, and 160a-160r of FIG. 6. In various embodiments, each SST slice has a first input 202 that receives the main cursor data signal D(N) and a second input 204 that receives one of (i) a complement of the main cursor data signal Db(N), (ii) the pre-cursor data signal D(N−1), and (iii) the post-cursor data signal D(N+1). Complementary pass gates 206 and 208 are used to select which input is passed to the output. In various embodiments, the complementary pass gates 206 and 208 are controlled in response to the respective bits of the signals K_PRE, K_POST, and K_SWING_DOWN. For example, in some embodiments, the bit K_PRE [4] set to 1 means for that particular slice the signal D(N−1) is sent to the output, and bit K_PRE[4] set to 0 means for that particular slice the signal D(N) is sent to the output. The other slices would operate similarly.

The functions represented by the diagrams of FIGS. 1-8 may be implemented (e.g., modeled, simulated, etc.) using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure, The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first coding circuit configured to generate a plurality of digital filter control codes in response to a first filter coefficient, a second filter coefficient, a third filter coefficient, and a control signal, wherein said control signal selects between a plurality of communication specifications;
   a second coding circuit configured to generate a plurality of driver slice control codes in response to said plurality of digital filter control codes; and
   a plurality of source series terminated driver slices configured to generate an output signal according to a selected communication specification in response to said plurality of driver slice control codes, a main cursor signal, a pre-cursor signal, and a post cursor signal, wherein (i) a first set of said source series terminated driver slices receive said main cursor signal at a first input, a complement of the main cursor signal at a second input, and a first driver slice control code at a third input, (ii) a second set of said source series terminated driver slices receive said main cursor signal at a first input, said pre-cursor signal at a second input, and a second driver slice control code at a third input, and (iii) a third set of said source series terminated driver slices receive said main cursor signal at a first input, said post-cursor signal at a second input, and a third driver slice control code at a third input.

2. The apparatus according to claim 1, wherein in a first mode said output signal is compliant with at least one Ethernet specification and in a second mode said output signal is compliant with a peripheral component interconnect express (PCIe) specification.

3. The apparatus according to claim 1, further comprising a delay line configured to generate said main cursor signal, said pre-cursor signal, and said post cursor signal in response to a serial data stream.

4. The apparatus according to claim 3, wherein said delay line comprises a shift register.

5. The apparatus according to claim 1, wherein said apparatus is part of a feed forward equalizer.

6. The apparatus according to claim 1, wherein said apparatus is part of a finite impulse response (FIR) filter.

7. The apparatus according to claim 1 wherein said apparatus is part of a three-tap filter.

8. The apparatus according to claim 1, wherein said apparatus is part of a serializer-deserializer.

9. The apparatus according to claim 1 wherein said apparatus is implemented on an integrated circuit.

10. The apparatus according to claim 1, wherein each of said sets of source series terminated driver slices is divided into a number of groups with each group controlled by a respective bit of the respective driver slice control code.

11. The apparatus according to claim 10, wherein:
    said first set of source series terminated driver slices is divided into six groups;
    said second set of source series terminated driver slices is divided into five groups; and
    said third set of source series terminated driver slices is divided into five groups.

12. The apparatus according to claim 1, further comprising a control circuit configured to generate said first, second, and third filter coefficients, said control signal, and a reference clock signal.

13. The apparatus(method) according to claim 12, wherein said first, second, and third filter coefficients are generated based upon coefficients received from an Ethernet physical coding sublayer (PCS) layer.

14. The apparatus according to claim 12, wherein said first, second, and third filter coefficients are generated based upon coefficients received from an a peripheral component interconnect express (PCIe) physical interface (PIPE) layer.

15. An apparatus for generating a serial output signal comprising:
    means for generating a plurality of digital filter control codes in response to a first filter coefficient, a second filter coefficient, a third filter coefficient, and a control signal, wherein said control signal selects between a plurality of communication specifications;
    means for generating a plurality of driver slice control codes in response to said plurality of digital filter control codes; and
    means for generating an output signal using a plurality of source series terminated driver slices according to a selected communication specification in response to said plurality of driver slice control codes, a main cursor signal, a pre-cursor signal, and a post cursor signal, wherein (i) a first set of said source series terminated driver slices receive said main cursor signal at a first input, a complement of the main cursor signal at a second input, and a first driver slice control code at a third input, (ii) a second set of said source series terminated driver slices receive said main cursor signal at a first input, said pre-cursor signal at a second input, and a second driver slice control code at a third input, and (iii) a third set of said source series terminated driver slices receive said main cursor signal at a first input, said post-cursor signal at a second input, and a third driver slice control code at a third input.

16. A method for generating a serial output signal comprising:
    generating a plurality of digital filter control codes in response to a plurality of filter coefficients and a control signal, wherein said control signal selects between a plurality of communication specifications;
    generating a plurality of driver slice control codes in response to said plurality of digital filter control codes; and
    generating an output signal using a plurality of source series terminated driver slices according to a selected communication specification in response to said plurality of driver slice control codes, a main cursor signal, a pre-cursor signal, and a post cursor signal, wherein (i) a first set of said source series terminated driver slices receive said main cursor signal at a first input, a complement of the main cursor signal at a second input, and a first driver slice control code at a third input, (ii) a second set of said source series terminated driver slices receive said main cursor signal at a first input, said pre-cursor sicrnal at a second input, and a second driver slice control code at a third input, and (iii) a third set of said source series terminated driver slices receive said main cursor signal at a first input, said post-cursor signal at a second input, and a third driver slice control code at a third input.

17. The method according to claim 16, wherein in a first mode said output signal is compliant with at least one Ethernet specification and in a second mode said output signal is compliant with a peripheral component interconnect express specification.

18. The method according to claim 16, wherein said plurality of driver slice control codes define a feed forward equalizer operation.

19. The method according to claim 16, wherein said plurality of driver slice control codes define a finite impulse response (FIR) filter operation.

20. The method according to claim 16, wherein said plurality of driver slice control codes define a three tap finite impulse response (FIR) filter operation.

\* \* \* \* \*